3,063,922
**PROCESS FOR POLYMERIZING TETRAFLUORO-
ETHYLENE WITH SULFUR CHLORIDE PENTA-
FLUORIDE AND ULTRAVIOLET RADIATION**
Hugh Leithead Roberts, Northwich, England, assignor to
Imperial Chemical Industries Limited, London, Eng-
land, a corporation of Great Britain
No Drawing. Original application Sept. 18, 1959, Ser.
No. 840,796. Divided and this application Sept. 13,
1960, Ser. No. 55,708
7 Claims. (Cl. 204—163)

This invention relates to a new process for polymeriz-
ing tetrafluoroethylene and for making new polymeric
compounds containing carbon, fluorine and sulphur.

In U.S. application Serial No. 806,771, filed April 16,
1959, there is described sulphur chloride pentafluoride
$SF_5Cl$, and its preparation.

It has now been discovered that under the influence of
ultraviolet light this compound initiates the polymeriza-
tion of tetrafluoroethylene to give, depending on the
reaction conditions, polytetrafluoroethylenes of high mo-
lecular weight, and new polymeric compounds of rela-
tively low molecular weight which are believed to be
best described as telomers of tetrafluoroethylene and sul-
phur chloride pentafluoride.

The new process of the present invention for polym-
erizing tetrafluoroethylene does not require an aqueous
reaction system, and consequently is an improvement over
known methods which require such systems and as a re-
sult cause corrosion of plant and involve the step of dry-
ing the polymer. Another advantage of the present proc-
ess is the ability to make polytetrafluoroethylenes of dif-
ferent molecular weights by varying the proportion of
sulphur chloride pentafluoride added to the tetrafluoro-
ethylene.

According to this invention, there is provided a process
for polymerizing tetrafluoroethylene and for making tel-
omers of tetrafluoroethylene and sulphur chloride penta-
fluoride comprising subjecting a mixture of tetrafluoroeth-
ylene and sulphur chloride pentafluoride to the action of
ultraviolet light.

The reaction should be carried out in a moisture-free
environment but it may if desired take place in a suitable
inert organic solvent. It is conveniently performed at
atmospheric pressure but elevated pressures, for example
up to several hundred atmospheres, may be used, their
magnitude being determined by the strength of the polym-
erization apparatus which necessarily includes components
made of quartz or other materials transparent to ultra-
violet light.

The reaction is usually carried out at room temperature
or below, but elevated temperature, for example up to
about 250° C., may be employed provided means are
available to remove the heat of reaction quickly enough
to prevent explosive decompositions occurring.

Ultraviolet radiation of wavelengths below about 3000
A. is the preferred type, such for example as the emis-
sion from low-pressure mercury vapor lamps, which is
rich in the 2537 A. line.

The molecular weight of the polymers and telomers of
tetrafluoroethylene obtained in the process is largely gov-
erned by the proportion of sulphur chloride pentafluoride
in the reaction mixture. When this proportion is small,
for example in the range 0.1 to 0.001% molar and less,
the polymers are solids with properties substantially in-
distinguishable from polytetrafluoroethylene made by
known methods. Up to about 3% molar solids are ob-
tained having softening points above 300° C. but with
greater proportions, lower melting point solids are formed
whilst with proportions greater than about 30% molar,
mainly liquid products are obtained. It would thus ap-
pear that the process can yield a series of products rang-
ing from high molecular weight compounds having
—$CF_2$—$CF_2$— chains of such length that the end groups,
which presumably are —$SF_5$ and —Cl, are such an in-
significant fraction of the molecule as to have no meas-
urable effect on its properties, down to relatively low
molecular weight compounds having shorter chains whose
properties are influenced by the end groups. The high
molecular weight compounds for example, exhibit infra-
red spectra indistinguishable from that of polytetrafluoro-
ethylene made by known methods, but with decreasing
molecular weight the compounds begin to show with in-
creasing intensity a band at wave number of 890 cm.$^{-1}$
and attributed to S–F bonds. It is these lower molecu-
lar weight compounds that we have described as telomers;
they possess good thermal stability and include liquids
suitable as heat-transfer agents and greases suitable as
lubricants.

In one way of carrying out the process, a silica reac-
tion vessel is connected to stainless steel filling equip-
ment by means of which the vessel may be pressurized
with a mixture of tetrafluoroethylene and sulphur chlo-
ride pentafluoride up to a maximum of about 10 atmos-
pheres. The silica vessel is irradiated with a low-pres-
sure mercury vapor lamp and polymerization sets in
rapidly, the rate being roughly proportional to the pres-
sure. The vessel may be repressurized several times with
reaction mixture and the polymerization carried on for
several hours if desired. In the examples below which il-
lustrate but do not restrict the present invention, the meth-
od of carrying out the process is as above.

*Example 1*

In an apparatus as described above a mixture of tetra-
fluoroethylene and sulphur chloride pentafluoride con-
taining approximately 0.001% molar of the latter was
introduced into the silica vessel, which had a volume of
about 300 mls., and allowed to react at a maximum pres-
sure of 7 atmospheres and at room temperature for six
hours.

A white solid was obtained having a melt viscosity at
440° C. of more than $10^7$ poises and a sulphur content of
less than 0.1% by weight and showing by infra-red anal-
ysis the characteristic bands attributable to polytetra-
fluoroethylene and no bands at a wave number of 890
cm.$^{-1}$. At 380° C. the weight loss of the solid was
0.0028% per hour.

*Example 2*

In a similar experiment to that of Example 1, but
with a sulphur pentafluoride proportion of approximately
0.01% molar a similar white solid was obtained which
showed a weight loss at 380° C. of 0.0043% per hour.

*Example 3*

In a similar experiment to that in Example 1, but with
a sulphur chloride pentafluoride content of approximate-
ly 0.10% molar a similar white solid was obtained which
showed a weight loss of 0.0091% per hour and a very
slight indication by infra-red analysis of a band at a wave
number of 890 cm.$^{-1}$.

*Example 4*

In a similar experiment to that in Example 1, but with
a sulphur chloride pentafluoride proportion of approxi-
mately 1.0% molar and with a maximum pressure of
about 1 atmosphere a white solid was obtained showing
by infra-red analysis a small band at a wave number of
890 cm.$^{-1}$ and having a melting point of over 400° C.
Analysis gave C 23.8%, F 73.6%, Cl 1.7% which corre-
sponds roughly to a molecular weight of 2500 assuming
one Cl atom per molecule.

Example 5

In a similar experiment to that in Example 4, but with a sulphur chloride pentafluoride proportion of approximately 3.0% molar a white solid was obtained which could be separated by hot extraction with carbon tetrachloride into fractions melting at approximately 315°, 150°–157° and 96–110° C. These, respectively, were insoluble in hot carbon tetrachloride, precipitated from it on cooling, and left behind on evaporating it. Infrared analysis of the unfractionated material showed a moderate band at a wave number of 890 cm.$^{-1}$. Analysis gave C 21.5%, F 73.0%, Cl 3.0% which corresponds roughly to an average molecular weight of 1200.

Example 6, 7 and 8

In these examples presented in the table below, the effect of increasing proportions of sulphur chloride pentafluoride is shown. The reactions were carried out substantially as in Example 5, but at approximately atmospheric pressure.

| Ex. | Percent molar $SF_5Cl$ | Melting points of fractions | | |
|---|---|---|---|---|
| | | 1 | 2 | 3 |
| | | Degrees | Degrees | Degrees |
| 6 | 20 | 200–220 | 130–145 | 70–80 |
| 7 | 30 | 190–205 | 120–140 | 68–78 |
| 8 | 50 | liquid products only | | |

The present application is a division of U.S. application Serial No. 840,796, filed September 18, 1959.

What I claim is:

1. A process for polymerizing tetrafluoroethylene comprising subjecting a mixture of tetrafluoroethylene and at least 0.1% of sulphur chloride pentafluoride to the action of ultraviolet radiation.

2. A process for making solid polymers of tetrafluoroethylene comprising subjecting a mixture of tetrafluoroethylene and sulphur chloride pentafluoride containing at least 0.1% and less than about 3% molar of the latter to the action of ultraviolet radiation.

3. A process for making telomers of tetrafluoroethylene and sulphur chloride pentafluoride comprising subjecting a mixture of tetrafluoroethylene and sulphur chloride pentafluoride containing from about 3 to 50% molar of the latter to the action of ultraviolet radiation.

4. A process as claimed in claim 1 in which the ultraviolet radiation is of wave lengths less than 3000 A.

5. A process as claimed in claim 1 when carried out at elevated pressures and temperatures.

6. A process as claimed in claim 5 in which the pressure is between 1 and 10 atmospheres and the temperature between ambient temperature and 250° C.

7. A process as claimed in claim 4 in which the ultraviolet radiation in mainly of wave length 2537 A.

References Cited in the file of this patent

UNITED STATES PATENTS 2,846,472    Tiers _____ Aug. 5, 1958